Patented Oct. 29, 1940

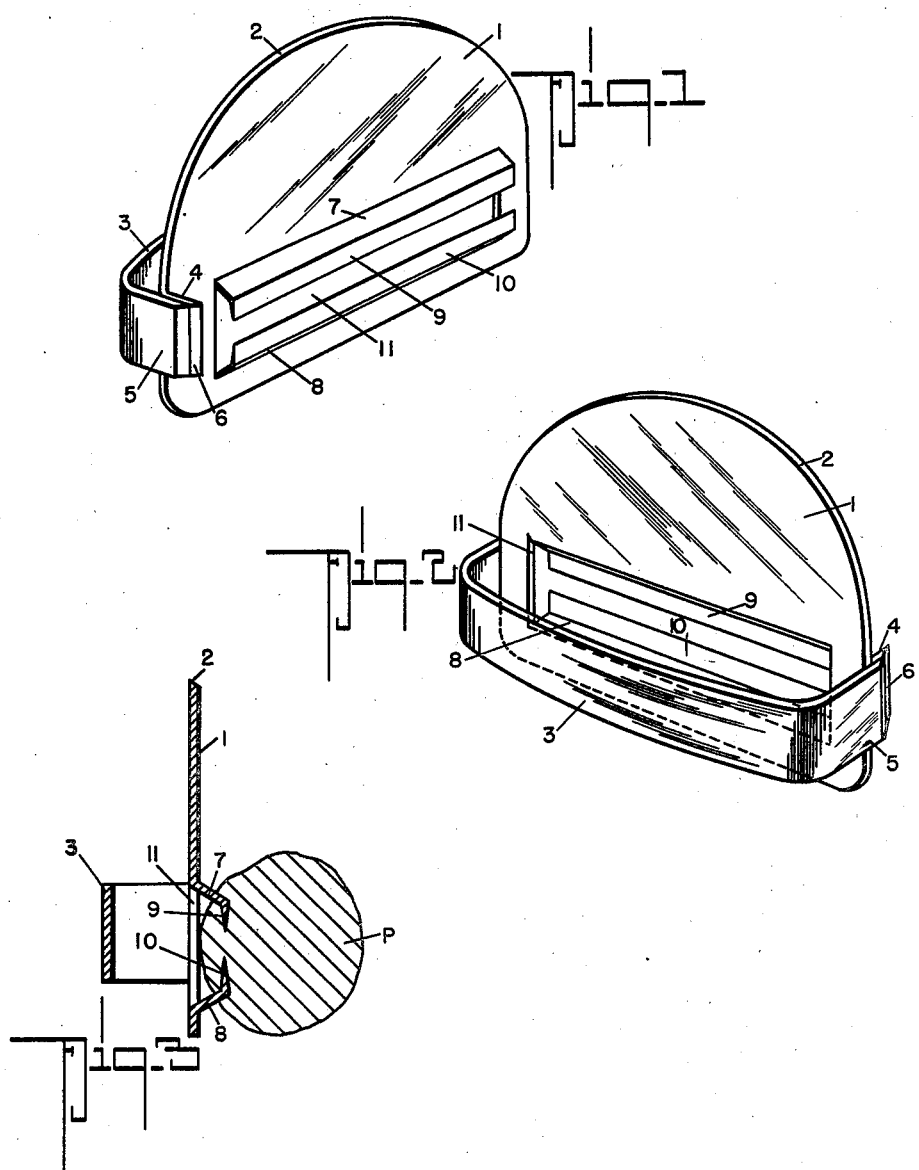

2,219,413

UNITED STATES PATENT OFFICE 2,219,413

CULINARY HAND TOOL

Mose R. Dellar, Spokane, Wash.

Application March 15, 1938, Serial No. 196,005

3 Claims. (Cl. 294—1)

The present invention relates to an improved culinary hand tool or kitchen implement in which are combined features, constructions and arrangements of parts that adapt the implement for use either as a holder or support for food products while in the process of preparation, as well as for use of the tool as a cutting or chopping implement, and for other purposes.

When employed in the performance of its functions as a holder, the device is especially adapted for supporting or holding fruits, vegetables, and other foods or food products, to facilitate slicing, shredding, grating and other operations on the retained article that are carried out in various ways. Under these conditions the device is effective in protecting or guarding the hand that grasps the holder against injury by a knife or other similar implement held in the other hand of the user, and the holder or support maintains the article in proper position for most efficient use of the knife or other implement used on the article.

When employed as a chopper or cutting device, the tool or implement is most effective for use in a chopping bowl, on a cutting board, or in connection with various other elements employed in the kitchen, at sandwich stands, bars, and the like where thin slicing of an article, comminuting, shredding, and grating are desirable.

The invention consists in a hand tool or implement of this character that involves certain novel features of construction, combinations, and arrangements of parts as will hereinafter be more fully set forth and claimed. In the accompanying drawing I have illustrated one complete example of the physical embodiment of my invention wherein the parts are combined and arranged according to one mode I have thus far devised for the practical application of the principles of my invention. It will be understood that changes and alterations may be made in the exemplifying drawing within the scope of my appended claims without departing from the principles of my invention.

In the accompanying drawing:

Figure 1 is a perspective view of a hand tool or implement embodying my invention, as seen from the front.

Figure 2 is a perspective view of the implement as seen from the rear.

Figure 3 is a vertical central transverse sectional view of the implement used as a holder for a pickle.

It will be understood that the implement, while shown in the drawing in position for use as a holder, is to be inverted or turned upside down for use as a chopping or cutting device, and for chopping or cutting purposes I employ a flat blade, preferably of sheet metal, forming the body 1 of the implement.

This blade or body of the implement is fashioned with a curved or semi-circular beveled and sharpened cutting edge 2 that is employed, when the implement is inverted, for cutting or chopping food products.

An offset handle 3 at the rear of the implement extends longitudinally from end to end thereof, and at one end of the blade a flange 4 projects at right angles therefrom, which flange may be integral with or welded to a complementary flange 5 that is bent at right angles from the handle, and an auxiliary cutting edge 6 may be fashioned at the front of this flanged formation for use in gouging out specks, spots, and other undesirable elements in vegetables, fruits, and other food products.

In Figures 1 and 2 the implement is shown in position for use as a holder, and in Figure 3, an article, as a pickle P, is illustrated as being held in the holder for slicing. For the performance of its functions as a holder, the blade of the implement is fashioned with a pair of complementary flanged jaws 7 and 8, and these jaws are provided with the respective sharpened edges 9 and 10. The jaws are preferably integral with the blade and they may be struck from the material of the blade, stamped out, or otherwise fashioned, leaving an open slot 11 that extends longitudinally of the blade. The jaws are fashioned in the lower portion of the holder, projecting from the blade at the side opposite to the handle, and one end or the inner end of the jaws terminates in close proximity to the flanged end 4—5 of the handle in order that the flanged end of the handle may form a stop for the article that is mounted in the jaws. As will be apparent from the drawings, the article as the pickle P may be slid along the front of the holder, the two complementary jaws penetrating the article along parallel lines and cutting slits along one edge of the article. In this manner the article is clamped between the jaws and against the holder, and the inner end of the article may be pressed against the stop 4—5 to assist in holding the article in stable position. In this position, a knife or other cutting implement may be employed for slicing the pickle, or the implement while grasped by the handle and while retaining the article may be applied to a grating appliance, or to a shredding appliance for the purpose of grating or shredding the article into comminuted or shredded portions.

Under these conditions it will be apparent that the hand which grasps the handle of the implement is protected and guarded from injury by the implement or appliance operating on the article, and the blade forms a substantial barrier between the operating implement or appliance and the hand.

It will be understood that the holder is designed for use with fruits such as oranges, lemons, apples, etc., and with vegetables of various kinds. When the holder is inverted and employed as a chopping or cutting implement, it is especially adapted for use with a chopping bowl in the preparation of salads, either fruit salads or vegetable salads.

Preferably the implement may be fashioned from an integral blank of sheet metal, the parts being struck up, stamped, or pressed, and fashioned to shape for the performance of their various functions, and in this manner the cost of production of the implement is held to a minimum.

Having thus fully described my invention, what I claim as new and desire to secure by Letters Patent is:

1. As a new article of manufacture, a tool comprising a plate portion forming a shield and having opposed flanged retaining jaws offset from one face of said plate portion, a stop associated with one end of said jaws, and a handle supported by said plate solely proximate to the opposite face thereof.

2. As a new article of manufacture, a culinary implement comprising a plate portion forming a shield and having a pair of opposed flanged retaining jaws parallel to and extending from one face of said plate portion, a stop associated with one end of said jaws, and a handle supported by said plate solely proximate to the opposite face thereof.

3. A plate forming a culinary shield and having a pair of opposed knife-edge flanged retaining jaws struck therefrom and disposed offset to one face of said plate, a stop associated with one end of said jaws, and a handle secured to opposite edges of the plate and solely proximate to the other face thereof.

MOSE R. DELLAR.